United States Patent [19]

Spacht

[11] 3,898,304

[45] Aug. 5, 1975

[54] HINDERED PHENOLIC PHOSPHITE ESTERS

[75] Inventor: Ronald B. Spacht, Hudson, Ohio

[73] Assignee: The Goodyear Tire & Rubber Company, Akron, Ohio

[22] Filed: Nov. 27, 1970

[21] Appl. No.: 93,513

Related U.S. Application Data

[60] Division of Ser. No. 758,583, Sept. 8, 1968, Pat. No. 3,567,683, which is a continuation-in-part of Ser. No. 381,525, July 9, 1964, abandoned.

[52] U.S. Cl. ............... 260/953; 260/973; 260/976
[51] Int. Cl.² ...................... C07F 9/12; C07F 9/14
[58] Field of Search ........................... 260/953

[56] References Cited

UNITED STATES PATENTS

| | | | |
|---|---|---|---|
| 3,112,286 | 11/1963 | Morris et al. | 260/953 X |
| 3,297,631 | 1/1967 | Bown et al. | 260/953 X |
| 3,510,507 | 5/1970 | Bown et al. | 260/953 X |

*Primary Examiner*—Anton H. Sutto
*Attorney, Agent, or Firm*—F. W. Brunner; J. M. Wallace, Jr.

[57] ABSTRACT

This invention relates to new hindered phenolic phosphite ester compounds and their use as stabilizers in rubber compositions.

4 Claims, No Drawings

HINDERED PHENOLIC PHOSPHITE ESTERS

This is a divisional application of copending application Ser. No. 758,583, filed Sept. 9, 1968 now U.S. Pat. No. 3,567,683, which was a continuation-in-part of application Ser. No. 381,525, filed July 9, 1964, now abandoned.

This invention relates to new compositions of matter and is particularly concerned with phosphite esters of polyphenols.

According to the present invention new compounds have been prepared which are phosphite esters of polyphenols. The polyphenols contain a ring substituent which has more than one carbon atom and may be prepared by condensing the phenol with an unsaturated hydrocarbon.

The new compositions can be structurally represented by the following formula:

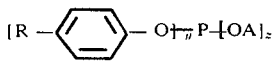

in which R is a hydrocarbon radical containing from 4 to 10 carbon atoms, P represents the phosphorus atom, and $y$ is selected from 0, 1 and 2, $z$ is selected from 1, 2 and 3, the sum of $y$ and $z$ equals 3 and A is selected from the group consisting of (I) 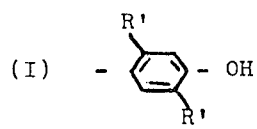

(II) 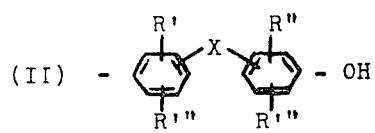

and (III) 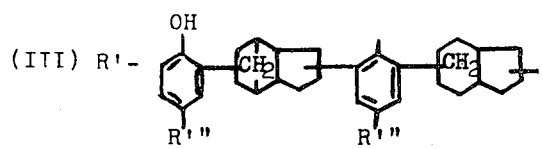

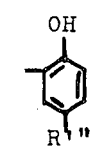

wherein R' and R" are selected from the group consisting of the same and different tertiary alkyl radicals containing from 4 to 9 carbon atoms, R''' is selected from hydrogen and alkyl radicals containing from 1 to 10 carbon atoms and X is a divalent radical selected from the group consisting of — S —, — O —, and saturated aliphatic radicals containing from 1 to 10 carbon atoms.

These products are prepared by reacting a phosphorus chloride having the formula

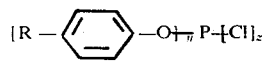

in which R is a hydrocarbon radical containing from 4 to 10 carbon atoms, P represents the phosphorus atom, $y$ is selected from 0, 1 and 2 and $z$ is selected from 1, 2 and 3 and the sum of $y$ and $z$ equals 3 with a phenol selected from the group consisting of phenols having the formula:

(I) 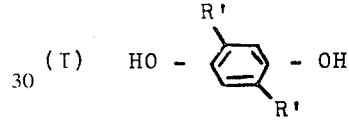

(II) 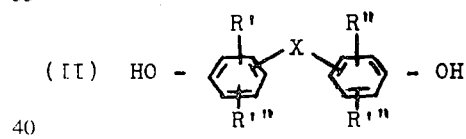

and (III) 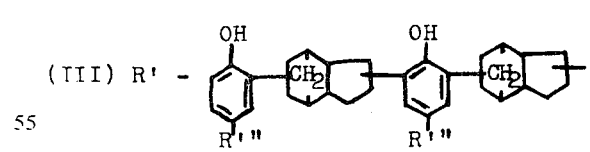

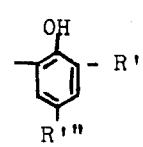

wherein R' and R" are selected from the group consisting of the same and different tertiary alkyl radicals containing from 4 to 9 carbon atoms, R''' is selected from hydrogen and alkyl radicals containing from one to 10 carbon atoms and X is a divalent radical selected from the group consisting of — S —, — O —, and saturated aliphatic radicals containing from 1 to 10 carbon atoms, the materials being reacted in the ratio of Z mols of the phenol to 1 mol of the phosphorus compound.

Illustrations of radicals represented by the symbols are, for example, where R represents hydrocarbon radicals containing from 4 to 10 carbon atoms R can be radicals such as the various butyl, pentyl, hexyl, heptyl, octyl, nonyl and decyl radicals and benzyl and phenethyl radicals; where R' and R'' represent tertiary alkyl radicals they may be radicals such as tertiary butyl, tertiary amyl, tertiary hexyl, tertiary heptyl, tertiary octyl, and tertiary nonyl; where X represents divalent aliphatic radicals containing from 1 to 10 carbon atoms the radicals can be methylene, ethylene, propylene, the butylene and isobutylidene radicals, amylene, hexylene, heptylene, octylene, nonylene and decylene radicals; and where R''' represents alkyl radicals containing from 1 to 10 carbon atoms the radicals can be methyl, ethyl, n-propyl, isopropyl, the various isomeric butyl, pentyl, hexyl, heptyl, octyl, nonyl and decyl radicals.

Illustrations of phenols of formula II where X is — S — are 2,2'-thio bis(4-methyl-6 tertiary butyl phenol); 4,4'-thio bis(3-methyl-6 tertiary butyl phenol); and 4,4'-thio bis(2,5 tertiary butyl phenol). Where X is — O — the phenols of formula II can be 2,2'-oxy bis(4-methyl 6 tertiary butyl phenol); 4,4'-oxy bis(3-methyl-6 tertiary butyl phenol); and 4,4'-oxy bis(2,6 tertiary butyl phenol).

Representative compounds illustrating the above formula would have substituents as follows:

and the purified materials are useful as stabilizers for organic materials subject to degradation on exposure to air or oxygen and are particularly useful as stabilizers for polymeric materials such as polyester resins and rubbers of various kinds, including natural rubber and the synthetic rubbers, especially cis-1,4 polyisoprene, polybutadiene, polychloroprene and copolymer rubbers such as butyl rubber, the rubbery butadiene-styrene copolymers, and the rubbery copolymers of butadiene and acrylonitrile.

In the practice of the invention the phosphite esters of phenols having desired characteristics can be obtained by reacting phosphorus trichloride with a selected alkylated phenol and then reacting the product with the proper hindered phenol. The preparation of the compounds is illustrated by the following examples.

EXAMPLE 1

Two hundred and four grams of styrenated phenol (88 percent mono alpha phenylethyl phenol and 12 percent di (alpha phenyl ethyl) phenol) and 412 grams of $PCl_3$ were mixed at room temperature and then slowly heated under reflux until no more HCl came off (about 4 hours). The excess $PCl_3$ was removed by heating the mixture to a pot temperature of 175° C. at 25 millimeters of mercury pressure. The mono (alpha phenylethyl phenoxy) phosphorus dichloride obtained weighed 288 grams. This product was reacted with various phenols. The data on these reactions is tabulated below.

| R | A | R' | R'' | R''' | X | Y | Z | Y | Z |
|---|---|---|---|---|---|---|---|---|---|
| Butyl | I | t-butyl | — | — | — | 1 | 2 | 2 | 1 |
| Butyl | II | t-butyl | t-butyl | — | methylene | 1 | 2 | 2 | 1 |
| Amyl | II | t-butyl | t-butyl | — | methylene | 1 | 2 | 2 | 1 |
| Hexyl | II | t-butyl | t-butyl | — | methylene | 1 | 2 | 2 | 1 |
| Octyl | II | t-amyl | t-amyl | — | ethylene | 1 | 2 | 2 | 1 |
| Octyl | II | t-amyl | t-amyl | — | propylene | 1 | 2 | 2 | 1 |
| Nonyl | II | t-hexyl | t-hexyl | — | butylidene | 1 | 2 | 2 | 1 |
| Decyl | II | t-octyl | t-octyl | — | isobutylidene | 1 | 2 | 2 | 1 |
| Butyl | III | t-butyl | — | methyl | — | 1 | 2 | 2 | 1 |
|  | III | t-butyl | — | methyl | — | 0 | 3 |  |  |

| Example No. | Grams of Product of Example 1 | Phenolic Compound | Product | % Phosphorus Found | Theory |
|---|---|---|---|---|---|
| 2 | 50.8 | 2,5 ditertiary butyl hydroquinone - 83.5 grams | 126 grams light brown sticky resin | 3.82 | 4.21 |
| 3 | 71.0 | Reaction product of nonyl phenol and HCHO - 157 grams | 212 grams light yellow soft resin | 2.78 | 3.40 |
| 4 | 30.5 | 2,2'-methylene bis(4-methyl-6-tertiary butyl phenol) - 68.4 grams | 92 grams brown sticky resin | 2.69 | 3.37 |
| 5 | 30.5 | Butylated reaction product of p-cresol and dicyclopentadiene - 136 grams | 159 grams brown resin | 1.73 | 1.95 |

The crude reaction mixture can be purified by washing with water and drying the material, preferably under vacuum, to remove water and other volatile substances. The products of the invention are customarily resins which vary from sticky resinous materials to soft resins to dry flaky materials. They are light colored and vary from light yellow to brown in color. The characteristics of the materials can be controlled by proper selection of the phenolic reactant. Both the unpurified The nonyl phenol-formaldehyde reaction product used in Example 3 was prepared as follows:

Two hundred and twenty grams of tertiary nonyl phenol were dissolved in 200 milliliters of toluene containing 5 milliliters of concentrated HCl. The mixture was heated to 80° C. Then 41 grams of 37 percent solution of formaldehyde in water were added. The mixture was refluxed until all the water was removed and then heated to 200° C. (pot) at 0.5 millimeters to remove unreacted nonyl phenol. A residue of 181 grams remained.

The butylated reaction product of p-cresol and dicyclopentadiene used in Example 5 was prepared as follows:

Three hundred and thirty grams of para-cresol and 9.0 grams of a phenol $BF_3$ complex containing 26 percent $BF_3$ were heated to 100° C. and then 132 grams of dicyclopentadiene were added over a period of 3½ hours. The excess para-cresol was removed by heating to a column temperature of 150° C. at 4 millimeters, this procedure also removed the $BF_3$ catalyst. A residue of 316 grams was obtained.

Two hundred and thirty-six grams of this product were dissolved in an equal weight of toluene and 4.0 grams of $H_2SO_4$ added. The solution was heated to 80° C. and 168 grams of isobutene added over a period of 1¾ hours. The mixture was heated 1 hour longer, then the catalyst was destroyed with a $Na_2CO_3$ solution. Volatiles and unreacted materials were removed by heating to 175° C. at 30 millimeters. Catalyst residues were removed by filtration. Weight of the product was 313 grams.

EXAMPLE 6

One hundred and thirty-six grams of a butylated reaction product of para-cresol and dicyclopentadiene prepared as above were dissolved in 200 milliliters of toluene and warmed to 70° C. Then 32.2 grams of mono (tertiary nonyl phenoxy) phosphorus dichloride were added. The mixture was heated to a temperature of from 70° to 80° C. for 3 hours after all of the phosphorus compound had been added. Then the mixture was heated to 180° C. at 20 millimeters of mercury pressure to remove volatile materials. The product obtained as a residue weighed 157 grams. It was a brown resin. On analysis the percent phosphorus found in the product was 1.87. The percent phosphorus according to theory is 1.92.

EXAMPLE 7

One hundred and seventy-nine grams of a butylated reaction product of p-cresol and dicyclopentadiene were dissolved in 200 milliliters of toluene and then 12.5 grams of $PCl_3$ added slowly at 60° C. Nitrogen gas was bubbled through the mixture to remove the last traces of HCl. Finally the mixture was heated to 190° C. at 200 millimeters of mercury pressure to remove the toluene. The product obtained was a dark brittle resin.

EXAMPLE 8

Two hundred grams of 2,5 ditertiary amyl hydroquinone were placed in a glass flask that was equipped with a stirrer, a dropping funnel and a reflux condenser and slurried with 400 milliliters of toluene. Then 125 grams of di(tertiary nonyl phenoxy) phosphorus chloride were added dropwise at 70° C. After all was added the mixture was refluxed for 3 hours. The excess 2,5 ditertiary amyl hydroquinone was removed by heating the mixture to 240° C. (pot temperature at 8 millimeters of mercury pressure). One hundred and fifty-four grams of product remained as a sticky light brown resin. On analysis the percent of phosphorus in the product was found to be 4.10. The percent phosphorus in the product according to theory is 4.12.

EXAMPLE 9

Fifty-three and one-half grams of mono (tertiary nonyl phenoxy) phosphorus dichloride were added to a slurry of 2,5 ditertiary amyl hydroquinone in 200 milliliters of toluene at 70° C. The mixture was refluxed for 2 hours after all of the phosphorus compound had been added. Then the excess ditertiary amyl hydroquinone was removed by heating the mixture to 235° C. (pot temperature) at 8 millimeters of mercury pressure. The product obtained weighed 122 grams.

EXAMPLE 10

Sixty-eight grams of 2,2' methylene bis(4-methyl-6-tertiary butyl phenol) were dissolved in 200 milliliters of toluene and heated to 70° C. Thirty two grams of mono (tertiary nonyl phenoxy) phosphorus dichloride were then added. The mixture was heated for 4 hours. Then toluene and other volatile materials were removed by heating the mixture to a pot temperature of 175° C. at 15 millimeters of mercury pressure. The residue weighed 88.0 grams. The product was a soft brown resin. On analysis the percent phosphorus found in the product was 3.42. The precent phosphorus according to theory is 3.32.

The materials of the invention which are most preferred for use as stabilizers for rubber are the ones derived from the reaction products of a phenol and dicyclopentadiene and a phosphorus chloride. Of these the alkylated derivatives, especially the butylated products, are particularly preferred. The following examples show the effectiveness of these materials as antioxidants in a rubber stock. In these tests the antioxidants were incorporated in the following standard recipe for testing:

| | |
|---|---|
| Extracted Pale Crepe | 100.00 |
| Zinc Oxide | 5.00 |
| Sulfur | 3.00 |
| Stearic Acid | 1.50 |
| Antioxidant | 1.00 |
| Hexamethylenetetramine | 1.00 |

The following table shows the results obtained when cured rubber samples were tested in the oxygen bomb test:

TABLE (Cure — 50 Minutes at 285° F.)

| | Sample No. Control (No antioxidant) | Ex. 5 | Ex. 6 | Ex. 7 | A[1] | B[2] |
|---|---|---|---|---|---|---|
| Unaged Data | | | | | | |
| Original Tensile | 2100 | 1445 | 1850 | 2085 | 1655 | 1820 |
| Aged Data* | | | | | | |
| Final Tensile | 0 | 1510 | 1870 | 1785 | 920 | 965 |
| % Tensile | | | | | | |

TABLE — Continued (Cure — 50 Minutes at 285° F.)

| Unaged Data | Sample No. Control (No antioxidant) | Ex. 5 | Ex. 6 | Ex. 7 | A[1] | B[2] |
|---|---|---|---|---|---|---|
| Retention | 0 | 104.2 | 101.0 | 97.8 | 55.6 | 53.1 |
| % Weight Gain | 16 | 0.024 | 0.024 | 0.011 | 3.85 | .352 |

\* — Aged 72 hours at 70° C. under 300 lbs. per square inch $O_2$ pressure
[1] — the antioxidant used is the reaction product of butylated phenol sulfide and tertiary nonyl phenoxy phosphorous dichloride.
[2] — the antioxidant used is the reaction product of butylated m-p-cresol sulfide and tertiary nonyl phenoxy phosphorous dichloride.

The following table shows further results obtained when cured rubber samples were tested after 72 hours exposure in the oxygen bomb test at 70° C.

| | Age-Rite Geltrol** | | Ex. X | | Ex. IV | |
|---|---|---|---|---|---|---|
| Antioxidant Cure in Minutes | 70 | 90 | 70 | 90 | 70 | 90 |
| Original Tensile (psi)* | 2050 | 2900 | 2045 | 2180 | 2245 | 2235 |
| Final Tensile(psi)* (after 72 hrs. in oxygen bomb) | 0 | 0 | 1955 | 2040 | 1730 | 1900 |
| % Tensile Retention | 0 | 0 | 95.7 | 93.7 | 77.1 | 85.2 |

\* — psi — pounds per square inch
\*\* — compound sold by Goodrich which can be represented by the formula:

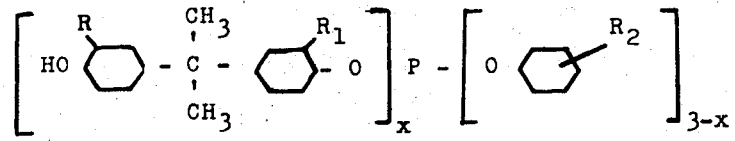

The products of the invention are useful as stabilizers for rubber. They may be incorporated in the rubber in solution, or added to rubber, coagulated rubber or rubber latex, or mixed with rubber in masticating machines such as mills and Banbury mixing machines. The amounts used are relatively small. The amount used will be from 0.25 to 5.0 percent by weight based on the weight of the rubber and preferably from 0.5 to 2 percent by weight based on the weight of the rubber.

The following table shows the results obtained where the rubber samples were SBR-1006. The oxygen absorption was compared to alkylated hindered phenol and commercial phosphite.

| Description of Stabilizer Used with the SBR-1006 | Hours | % $O_2$ Absorbed at 80° C. |
|---|---|---|
| Example 2 | 980 | 0.7 |
| 3 | 800 | 0.4 |
| 4 | 990 | 0.6 |
| 5 | 970 | 0.7 |
| 6 | 460 | 0.3 |
| 8 | 540 | 0.3 |
| 10 | 800 | 0.3 |
| Control-alkylated hindered phenol | 105 | 1.3 |
| Control-commercial phosphite | 550 | 1.0 |

The data clearly show the superior stabilizing effect of the stabilizers from Examples 2, 3, 4, 5, 6, 8 and 10.

The oxygen absorption tests were conducted by dissolving in benzene portions of an unstabilized SBR polymer (1006). The benzene contained the antioxidant to be tested at a level of 1.00 part of antioxidant per 100 parts of SBR polymer. The cements so formed were poured onto aluminum foil so as to form a thin film. After drying the weight of rubber was obtained in connection with each sample. Thereafter the foil with the adhering rubber strip was placed in the oxygen absorption apparatus. The time required for each sample to absorb 1.0 percent oxygen was determined. This testing procedure is described in further detail in Industrial and Engineering Chemistry, 43, p. 456 (1951) and Industrial and Engineering Chemistry 45, p. 392 (1953).

While certain representative embodiments and details have been shows for the purpose of illustrating the invention it will be apparent to those skilled in this art that various changes and modifications may be made therein without departing from the spirit or scope of the invention.

I claim:

1. A product corresponding to the formula

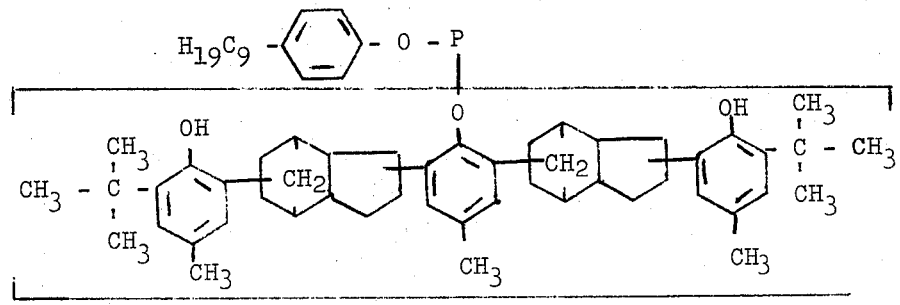

2. A product corresponding to the formula

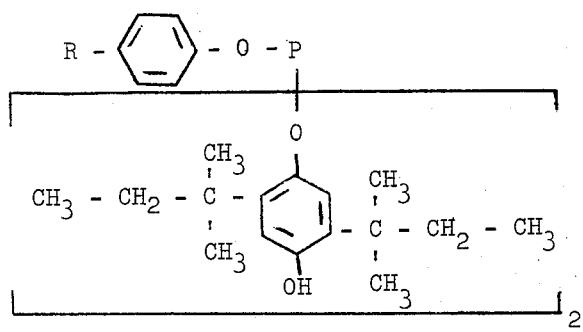

in which R is a hydrocarbon radical containing four to 10 carbon atoms selected from the group consisting of butyl, pentyl, hexyl, heptyl, octyl, nonyl, decyl, benzyl and phenethyl radicals.

3. The product prepared by reacting 1 mol of a phosphorus compound having the formula

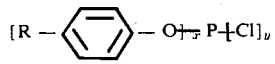

in which $x$ is 1 and $y$ is 2 and 2 mols of a phenol of the formula

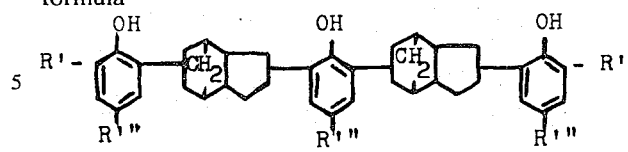

4. The product prepared by reacting 1 mol of $PCl_3$ with 3 mols of a phenol of the formula

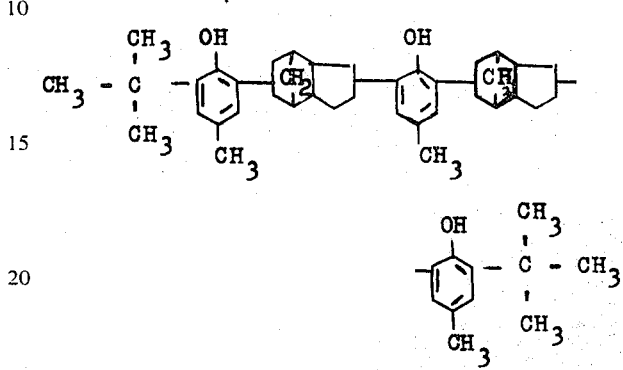

* * * * *

UNITED STATES PATENT AND TRADEMARK OFFICE
CERTIFICATE OF CORRECTION

PATENT NO. : 3,898,304
DATED : August 5, 1975
INVENTOR(S) : Ronald B. Spacht

It is certified that error appears in the above–identified patent and that said Letters Patent are hereby corrected as shown below:

Column 7 - Table, "Unaged Data" should be --Aged Data--.

Signed and Sealed this

Third Day of July 1979

[SEAL]

Attest:

LUTRELLE F. PARKER
Attesting Officer      Acting Commissioner of Patents and Trademarks